United States Patent
Shi et al.

(10) Patent No.: US 12,518,083 B2
(45) Date of Patent: Jan. 6, 2026

(54) METHOD FOR TEXT CLUSTERING WITH HEURISTIC AND MULTI-METRIC CONTROL

(71) Applicant: JPMorgan Chase Bank, N.A., New York, NY (US)

(72) Inventors: Jialei Shi, London (GB); John F. Buford, Somerset, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 350 days.

(21) Appl. No.: 18/226,736

(22) Filed: Jul. 26, 2023

(65) Prior Publication Data

US 2025/0036859 A1 Jan. 30, 2025

(51) Int. Cl.
*G06F 40/166* (2020.01)
*G06F 40/151* (2020.01)

(52) U.S. Cl.
CPC .......... *G06F 40/166* (2020.01); *G06F 40/151* (2020.01)

(58) Field of Classification Search
CPC .................................................. G06F 40/166
See application file for complete search history.

(56) References Cited

U.S. PATENT DOCUMENTS

| | | | | |
|---|---|---|---|---|
| 5,963,965 A | * | 10/1999 | Vogel | G06F 17/21 |
| 2005/0198027 A1 | * | 9/2005 | Hamaguchi | G06F 17/30 |
| 2012/0109960 A1 | * | 5/2012 | Mishina et al. | G06F 17/30 |
| 2023/0326222 A1 | * | 10/2023 | Hron, II | G06V 30/413 |
| 2024/0354375 A1 | * | 10/2024 | Horev et al. | G06F 18/231 |

* cited by examiner

*Primary Examiner* — James J Debrow

(74) *Attorney, Agent, or Firm* — Greenblum & Bernstein, P.L.C.

(57) ABSTRACT

Implementations generally relate to text clustering with heuristic and multi-metric control. In some implementations, a method includes receiving an electronic source document containing text. The method further includes dividing the text into text units, encoding the text units, and transforming the text units into numerical values. The method further includes generating a graph of the text units based on the numeric values, where the graph includes nodes corresponding to the text units and edges corresponding to pairs of the text units. The method further includes ordering the text units into text clusters based on the graph of the text units. The method further includes generating an electronic target document that presents the text clusters based on one or more preference heuristics.

20 Claims, 7 Drawing Sheets

Unclustered text:

In a shocking turn of events, a small town on south hemisphere of Mars has been hit with a wave of mysterious disappearances. According to an anonymous source, at least five Martian have gone missing in the past week, leaving their families and friends in a state of panic. The disappearances seem to be completely random, with no apparent connection between the victims. The Martian authorities have launched a full-scale investigation and announced global-wise emergency state. Meanwhile, residents of the south hemisphere are being advised to stay vigilant and take extra precautions to ensure their safety. Some of the residents voluntarily formed the rescue and support teams to support victims' families during this difficult time. "We need food, therapists, GPS, etc. to carry out works," said one of the volunteer. Speaker of the Martian L.F. party, the largest opposition parties, charges the president is responsible for the mysterious disappearance as he was involved in trafficking Martian to Plutonian through his own company Martian Special Trade ltd. 5 years ago, even though the final trial resulted in the acquittal of him.

| Cluster | Results of Conventional Art (BERT sentence embedding + Kmeans) | Results of Implementations of the Disclosure |
|---|---|---|
| Cluster 1 | In a shocking turn of events, a small town on south hemisphere of Mars has been hit with a wave of mysterious disappearances. The Martian authorities have launched a full-scale investigation and announced global-wise emergency state. party, the largest opposition parties, charges the president is responsible for the mysterious disappearance as he was involved in trafficking Martian to Plutonian through his own company Martian Special Trade ltd. Speaker of the Martian L.F. | In a shocking turn of events, a small town on south hemisphere of Mars has been hit with a wave of mysterious disappearances. Meanwhile, residents of the south hemisphere are being advised to stay vigilant and take extra precautions to ensure their safety. |
| Cluster 2 | According to an anonymous source, at least five Martian have gone missing in the past week, leaving their families and friends in a state of panic. The disappearances seem to be completely random, with no apparent connection between the victims. | According to an anonymous source, at least five Martian have gone missing in the past week, leaving their families and friends in a state of panic. The disappearances seem to be completely random, with no apparent connection between the victims. The Martian authorities have launched a full-scale investigation and announced global-wise emergency state. |
| Cluster 3 | Meanwhile, residents of the south hemisphere are being advised to stay vigilant and take extra precautions to ensure their safety. Some of the residents voluntarily formed the rescue and support teams to support victims' families during this difficult time. to carry outworks," said one of the volunteer. "We need food, therapists, GPS, etc. | Some of the residents voluntarily formed the rescue and support teams to support victims' families during this difficult time. "We need food, therapists, GPS, etc. to carry out works," said one of the volunteer. |
| Cluster 4 | 5 years ago, even though the final trial resulted in the acquittal of him. | Speaker of the Martian L.F. party, the largest opposition parties, charges the president is responsible for the mysterious disappearance as he was involved in trafficking Martian to Plutonian through his own company Martian Special Trade ltd. 5 years ago, even though the final trial resulted in the acquittal of him. |

FIG. 4

METHOD FOR TEXT CLUSTERING WITH HEURISTIC AND MULTI-METRIC CONTROL

BACKGROUND

Enterprises perform many business processes that collect, analyze, process, produce, and/or distribute text information. Operational efficiency of such business processes requires automation of natural language processing. For example, in the context of documentation, organizing text into clusters is known to improve readability and decrease comprehension time for viewers. Techniques exist that order components of text clusters to improve readability.

BRIEF DESCRIPTION OF THE DRAWINGS

FIG. 3 illustrates an example electronic source document containing unclustered text, according to some implementations.

FIG. 4 is a table illustrating example results of conventional clustered text units compared to example results of clustered text units that are based implementations described herein.

DETAILED DESCRIPTION

Implementations described herein provide text clustering with heuristic and multi-metric control. Unlike conventional text clustering, implementations described herein enable a system to select among various combinations of metrics and preference heuristics for text clustering, which in turn enable multi-metric control for ordering cluster content.

Automatically organizing text into sections, paragraphs, sentences, bullets, and other structural units is an important step in text transformation tasks such as summarization, generation, outlining, highlighting, extraction, etc. The automated organization of text units into a collection of sets may be treated as a clustering problem. These collections of sets may be referred to as clusters of text, or text clusters. As described in more detail herein, a system may select various metrics and preference heuristics that may be used for determining the quality of how text units are organized into clusters. Metrics may be used for determining the quality of how text units are organized into clusters, including saliency, relevance, proximity in a related corpus, distance in an embedding space. Preference heuristics may include saliency, relevance, proximity in a related corpus, and distance in an embedding space.

As described in more detail herein, implementations, address inherent limitations of conventional text clustering using encoding in a high-dimensional space such as an embedding (e.g., word embeddings, sentence embeddings, etc.). Implementations described herein that are directed to encoding enabled distance relationships between text objects are interpreted optimally for cluster determination in the N space and multiple text properties to be collectively optimized.

Implementations for text clustering leverage and optimize multiple text properties, which combine: representing text with graph and allowing combinations of closed form metrics or mathematical estimators and customizable heuristic rules. In various embodiments, the system utilizes closed form metrics (e.g., ordering, length, etc.) or mathematical estimators (e.g., statistical rules, distance, categorical labels, etc.) for subjective metrics (e.g., cohesion, congruity, etc.). The system also utilizes customizable heuristic rules to suit subjective needs and criteria of users.

Figure 1:
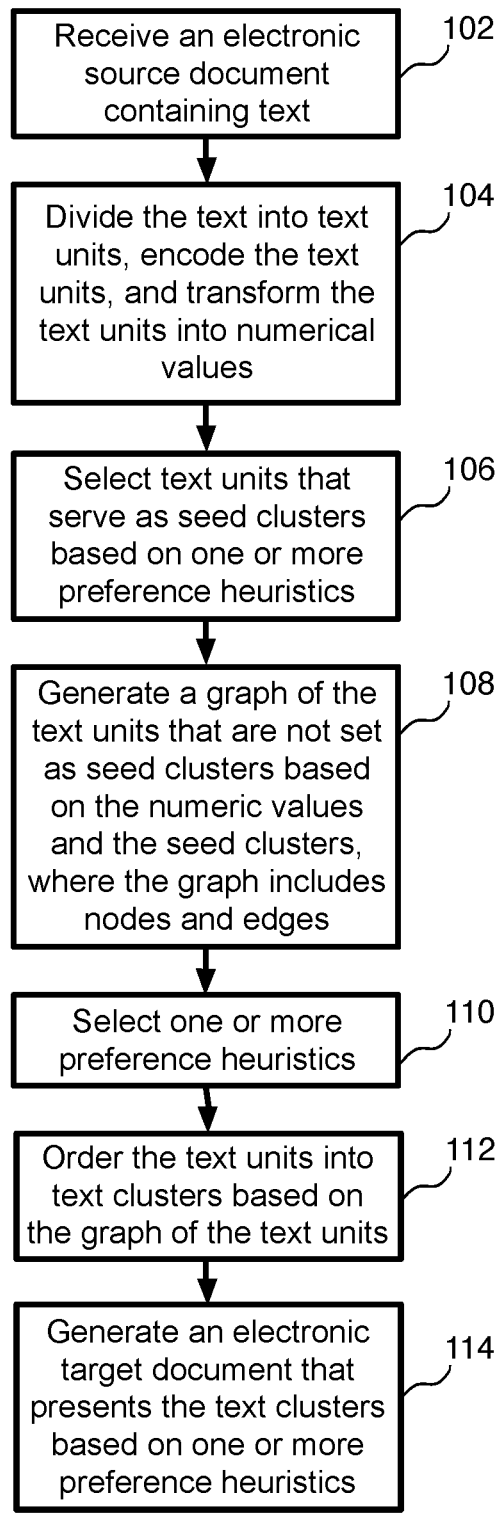
FIG. 1 is a flow diagram illustrating an example process for providing text clustering with heuristic and multi-metric control, according to some implementations.

FIG. 1 is a flow diagram 100 illustrating an example process for providing text clustering with heuristic and multi-metric control, according to some implementations. Implementations described herein are superior to conventional K-means clustering solutions, which are not designed to perform text encoding and clustering on top of the encoded text units. In various implementations, a method is initiated at block 102, where a system such as system 102 receives an electronic source document containing text.

At block 104, the system divides the text into text units, encodes the text units, and transforms the text units into numerical values. In various implementations, the text units include one or more of text, sentences, and paragraphs. Text units or textual units may include: phrase, sentence, paragraph, bullet, quote, section, page, chapter, document, book, stream, transcript, etc. The terms text units and textual units may be used interchangeably. In various implementations, the encoding transforms the text units into numerical values, where the text units are associated with their respective numeric values.

At block 106, the system selects text units that serve as seed clusters based on one or more preference heuristics. In various implementations, the system optionally computes seed clusters from the text units based on one or more preference heuristics or no preference heuristics (e.g., no seed clusters will be set then). Seed clusters are those formed by text units that satisfy one or more preference heuristics and will not be treated as a node in the next graph building step. In various implementations, the system defines a seed cluster formed by text unit/units based on a combination of computations and selection. For example, the system may apply a heuristic that lengthy text units will become seed clusters. The system computes the length of the text units, select those lengthy ones, and set them to seed clusters. The number of seed clusters formed by lengthy text units may vary, depending on the heuristics.

In various implementations, the system may apply one or more of the following preference heuristics to define seed cluster/clusters: textual units' length, labelled textual units, important textual units, and vocabulary normalization. Textual units' length may involve textual units with different lengths, where the system may treat the textual units differently. For example, a lengthy textual unit may be treated as a single seed cluster itself to achieve a balance of the clustering. Further implementations direct to textual units' length are described in more detail herein. Labelled textual units may involve the system pre-labelling textual units according to domain knowledge, audience's preference, or any other information, etc. For example, domain knowledge may include medical vocabulary. Other domain knowledge may include cyber vocabulary, or other vocabulary from another industry. In some implementations, a heuristic may be certain labels' textual unit that serve as a seed cluster or several units together is a cluster. Further implementations direct to pre-labelling are described in more detail herein. With regard to important textual units, a user may have heuristic to define an important textual unit, and the user may desire to have the important units classified as a seed cluster.

In some implementations, a vocabulary normalization may be a heuristic that normalizes words that have similar meanings into a common canonical vocabulary. If such heuristics are applied, a feedback loop can be triggered to improve the word embedding. Further implementations direct to vocabulary normalization are described in more detail herein.

In various implementations, the system implements heuristics at multiple different places. For example, the system may apply preference heuristics to compute/select seed cluster/clusters while the system builds a graph at block 108. In other words, the system builds a customized graph that takes some heuristics; others, like rebalancing happens at the end of all steps. In various implementations, the system applies preference heuristics such as balancing/rebalancing throughout the process (e.g., at the end of other or all steps, etc.).

At block 108, the system generates a graph of the text units not set as seed clusters based on the numeric values. In various implementations, the graph includes nodes corresponding to the text units and edges corresponding to pairs of the text units. In various implementations, when the system builds/generates the graph, the system applies preference heuristics and defines seed clusters based on the characteristics of the text units. After the graph is built, the system applies other types of preference heuristics (e.g., balancing/rebalancing heuristics, etc.).

At block 110, the system selects one or more preference heuristics. The type or types of preference heuristics may vary, depending on the particular implementation. For example, in various implementations, the system may select one or more preference heuristics, where one of the preference heuristics includes coherence. Implementations provide configurable ways of clustering such as optimal cohesion per cluster, which improves understandability and enables different applications with one algorithm. Cohesion avoids disjointed material in the same text cluster. Stated differently, cohesion ensures that like information is in the same text cluster. For example, using text meaning metric with preference heuristics on top of a graph representation highlights and/or emphasizes salient topics and optimal cohesion. A mixture of text metrics with rules enables novel ways of clustering. For example, implementations may form text clusters based on cosine similarity plus occurrence of entities or if a sentence satisfy a set of rules, such that it becomes a single cluster, as described herein. Such improvements of cohesion enable more meaningful clusters or desired clusters, which benefits end users in interpreting and understanding the clustered results.

Other preference heuristics are possible. For example, the system may select from any one or more of the following preference heuristics: coherence, cohesion, consistency, cohesiveness, concordance, consonance, connection, interconnection, interrelationship, intertextuality, congruity, continuity, linkage, solidarity, unity, harmony, oneness, sameness, wholeness, interrelatedness, togetherness, entireness, soundness, federation, balance, appropriate size, priority, etc. Example implementations directed to the preference heuristics of the graph are described in more detail herein.

Implementations described herein adapt to different application scenarios ranging from clustering to topic modelling, which save money and time for looking multiple solutions, with specific NLP jobs, chatbot, give examples, NLP to database back to NL, generative problems, etc.

In various implementations, when generating the graph of the text units, the system associates one or more preference heuristics with the nodes. The system also computes distance values for the edges. As indicated above, the system also computes seed clusters from the text units based on one or more preference heuristics associated with the nodes. Example implementations directed to the generation of the graph are described in more detail herein.

As indicated herein, one of the preference heuristics may include balancing. Such balancing provides better readability compared to the conventional art. Balanced text clusters enable an end user to better understand salient topics. Implementations enable customizable sentence ordering inside each cluster. Different sentence ordering heuristic rules enable an end user to identify important sentence faster. In general, better readability save end users' reading and understanding time, leading to an improvement of efficiency. Other preference heuristics are possible. The preference heuristics or combination thereof will depend on the particular implementation.

The following are example implementations of a balancing or rebalancing preference heuristic. In some implementations, a rebalancing heuristic may involve mathematical algorithms. For example, an assignment algorithm, similar to a linear sum assignment, may be utilized to achieve inter-clusters balance. A customized k-nearest neighbors (KNN) algorithm is a non-parametric, supervised learning classifier, which uses proximity to make classifications or predictions about the grouping of an individual data point. In some implementations, a rebalancing heuristic may involve an absolute distance threshold. For example, if nodes have a distance (e.g., could be any distance) to a center that is less than a predetermined value, then the system may render the node as belonging to the center. In various implementations, the system may use distance matrices to measure the distance between each pair of sentences. The distance may be based on the vectors or numerical values of the text units. Each distance may be a Euclidean distance or cosine similarities and can be computed directly on to top the of the numeric values of the vectors. In some implementations, a rebalancing heuristic may involve manually designed rules. The system may utilize any combination of unique rules that could be translated into math criteria to perform rebalancing. In some implementations, a rebalancing heuristic may involve vocabulary normalization. Here, the system rebalances sentences in general after similar words normalized into common vocabulary.

At block 112, the system orders text units into text clusters based on the graph of the text units. Example implementations directed to the ordering of the text units into text clusters are described in more detail herein.

At block 114, the system generates an electronic target document that presents the text clusters based on one or more preference heuristics. Example implementations directed to the generating of the target document are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 2:
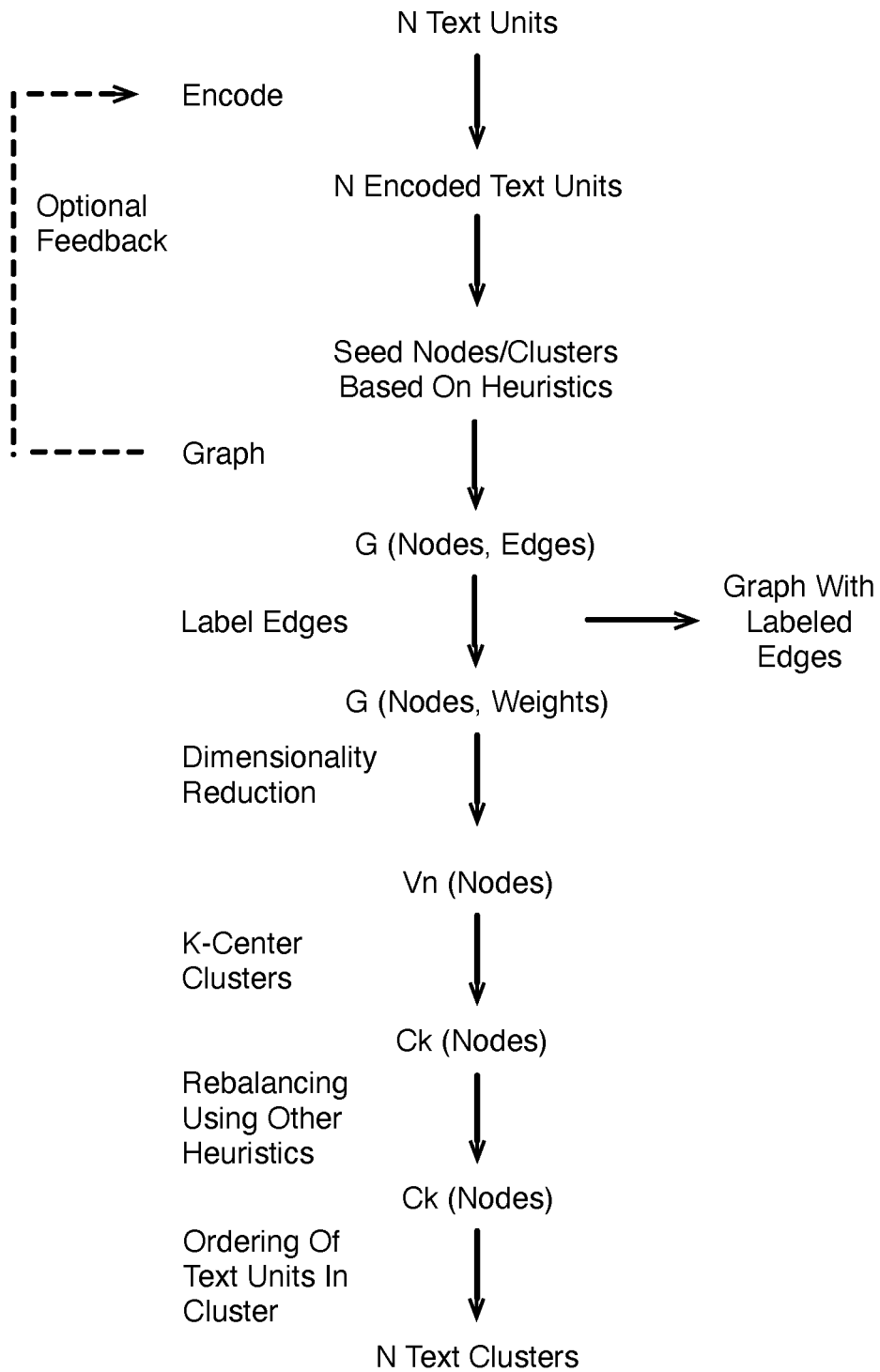
FIG. 2 is a flow diagram illustrating an example use case for text clustering involving preference heuristics used in computing a graph and outputting clustered text units, according to some implementations.

FIG. 2 is a flow diagram 200 illustrating an example use case for text clustering involving preference heuristics used in computing a graph and outputting clustered text units, according to some implementations. As shown, the system encodes N text units to transform them into N encoded text units. As described in more detail below, an optional feedback loop exists based on the graph, where the feedback loop informs future encoding to make such encoding more accurate. As indicated above, the system selects seed nodes, and treats these seed nodes as single stand-alone clusters based on preference heuristics.

The system generates a graph, where the graph contains node and edges, G (Nodes, Edges). The system also generates seed clusters using preference heuristics and label each node per the preference heuristics. For example, the system labels the edges with distances, wij=distance (Ni, Nj), based on one or more text metrics.

In various implementations, the system may apply one or more of the following text metrics: distance measures, NLP evaluation metrics, statistical distance, and divergence measures, as well as other text metrics described herein. The distance measures may include, for example, cosine similarities, Euclidian distance, Manhattan distance, and all other mathematical distances that could be applied on top of vectors or bag of words (BoW) representation of a corpus. NLP evaluation metrics may include, for example, recall-oriented understudy for Gisting evaluation, (ROUGE) scores, bilingual evaluation understudy (BLEU) scores and all other NLP metrics that could be used for evaluating similarities between two corpuses. Statistical distance or divergence measures may include total variance distance, Wasserstein distance, Kullback-Leibler (KL) divergence, Jensen-Shannon (JS) divergence and all other statistical measurements for distributions.

The system then outputs a graph with labeled edges, G (Nodes, Weights). In various implementations, the system performs dimensionality reduction on the graph, Vn (Nodes). The system also computes the top N eigenvectors of graph. The top N eigenvectors are the salient portions of the graph. The system then generates K-center clusters, Ck (Nodes) based on the N eigenvectors. The system then performs rebalancing using other heuristics, Ck (Nodes). The system then orders or reorders the text units in text clusters, and then outputs N text clusters.

Implementations described herein provide much impact with numerous benefits. Many natural language processing (NLP) tasks are measured by the quality of resulting text. Implementations may be adopted in many NLP jobs to generate optimal results. For example, in a chatbot use case, implementations may provide text clusters with ordering that would benefit the end user in reading and in understanding text faster. In a natural language to a structured query language (SQL) use case, if queried results contain free text, implementations may help in grouping text, which a SQL query cannot achieve. In a text documents triage use case, implementations may consolidate long documents containing news, summaries, etc. to short text like tweets, customer feedbacks, etc. Implementations may perform clustering based on multiple customizable instructions like meaning closeness, mentions of specific entities, length, sentiment, group of user defined rules, etc.

FIG. 3 illustrates an example electronic source document 300 containing unclustered text, according to some implementations. Example implementations directed to the clustering the unclustered text are described below in connection with FIG. 4.

FIG. 4 is a table 400 illustrating example results of conventional clustered text units compared to example results of clustered text units that are based implementations described herein. As shown, the first column 402 on the left shows the cluster numbers, the second column 404 in the middle shows results of conventional clustering, and the third column 406 on the right shows results of clustered text units that are based implementations described herein.

Referring to the results of the conventional clustering in column 402, clusters 1 to 4 reflect the clustered text but are imbalanced. For example, cluster 1 is long in length, clusters 2 and 3 are medium in length, and cluster 4 is short in length.

Conventional clustering may involve K-means, embedding and clustering. Some implementations described may involve some of these aspects at least in part, but also involve other aspects that optimize the text clusters, which are described in the following paragraph. K-means clustering involves randomly initialize k centers, calculating the Euclidean distances between each pair of points and centers, moving the k centers to minimize the sum of Euclidean distances, and repeating until the sum of distance converges. In various implementations, spectral embedding involves an n-by-k matrix V of selected eigenvectors, mapping of the original n data points (e.g., spectral embedding). Spectral clustering may involve calculating the first k eigenvectors (e.g., eigenvectors corresponding to the k smallest eigenvalues of L), consideration of a matrix formed by the first k eigenvectors; the $1^{th}$ row defines the features of graph node 1, and clustering the graph nodes based on these features (e.g., using k-means clustering). Kuhn-Munkres algorithm or Munkres assignment algorithm. A strong polynomial complexity solution to the assignment problem would assign n workers to k jobs with minimum effort.

Figure 5:
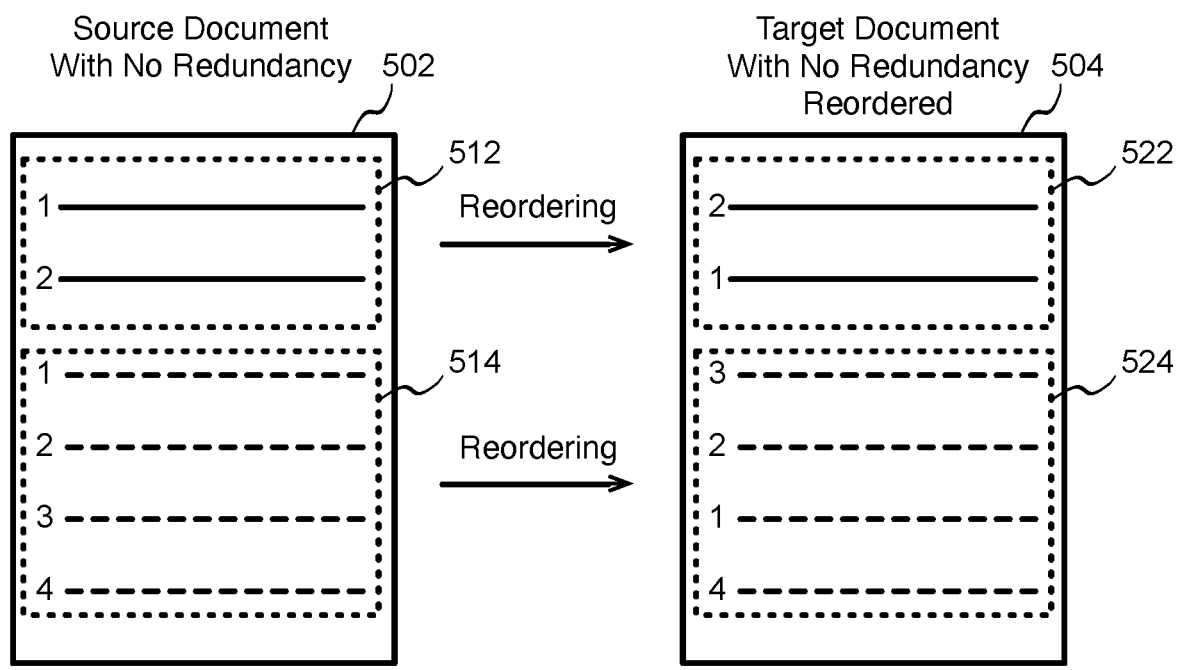
FIG. 5 illustrates an example source document with no redundancy and an example target document with no redundancy, where the target document contains text clusters that are reordered, according to some implementations.

In contrast to conventional solutions, implementations provide a balance and cohesive text clusters. In this example implementations, the inputs are referred to as text T (e.g., unclustered text of FIG. 3) and a number of clusters B (e.g., 4 text clusters as shown in FIG. 5).

The system separates the text T into an ordered set of sentences numbering S, and calculates a multiple $$M = \frac{S}{B}, \text{ if } M < 1.$$

The system directly returns each sentence as a cluster. Alternatively, in some implementations, the system may apply custom tokenization logic.

For the given set of sentences, the system calculates the standard deviation of words per sentence $\sigma$ and mean words per sentence p. Any sentences having words per sentence W>μ+M*$\sigma$ are members of the set of lengthy sentences $S_{len}$.

In some implementations, the determination of number of sentences per cluster β may be different for summaries with and without lengthy sentences. If $S_{len}$==∅(‖ the set of sentences S do not have lengthy sentences), and the system finds the smallest integer β>1 that satisfies β*B≥S, this step creates B'=B, S'=S and β'=3. Otherwise, the system concludes that the set of sentences S has lengthy sentences. To achieve the best balance, these steps create $B'=B_{norm}$, $S'=S_{norm}$ and $\beta'=\beta_{norm}$. This is an example, and other policies may be supported to suit the B requirements. Each lengthy sentence will be a single cluster, which gives the number of lengthy clusters: $B_{len}=S_{len}$ with $\beta_{len}=1$. The system calculates the number of normal clusters $B_{norm}=(B-B_{len})$ and sentence number per normal cluster $$\beta_{norm} = \text{ceil}\left(\frac{S_{norm}}{B_{norm}}\right).$$

The system records the index of the lengthy sentences to enable the reordering of the bullet points after grouping.

The system then calculates a pairwise grouping metric for all normal sentences, and formats the pairwise score into a symmetrical matrix $A_{i*j}$. Alternately, the grouping metric may be the pairwise Bert F-Score $F_{Bert}$.

The system then finds B' eigenvectors v with S' dimensions, $v_{S'*B'}$ from the graph Laplacian derived from the adjacency matrix calculated in the previous step where the pairwise grouping metric is calculated. The system then applies a k=B' K-means clustering on top of $v_{S'*B'}$ and finds the B'cluster centers in vector forms $C_{B'}$.

The system then rebalances with heuristics. For example, the system repeats each $C_{B'}$ for $\beta'$ times, get $\tilde{C}_{\beta'*B'}$ with labels: $L_{\beta'*B'}$. The system then runs a linear sum optimization to assign each $v_{s'}$ to a center $\tilde{C}_j$, $j \in [0, 1, 2, \beta'*B']$, based on the Euclidean distance between each sentence and center. The system then retrieves the original centers' labels. For the scenario above where there are no lengthy sentences, the system applies the following formula, $$L_{B'} = \text{floor}\left(\frac{L_{\beta'*B'}}{\beta'}\right).$$

For the scenario above where there is a lengthy sentence, the system applies the following formula, $$L_{B'} = \text{floor}\left(\frac{L_{\beta'*B'}}{\beta'}\right), L_{B_{len}} = B' + i, i \in [0, 1, 2, S_{len}].$$

The system then returns cluster information including which sentence(s) are in each cluster: $L_{B'}$, $L_{B_{len}}$. There may be k clusters, each containing at least one sentence. Within a cluster, sentences are ordered according to cluster-ordering policy (COP). Other information may include enabling explanation of the cluster choices, an ability to drive the algorithm with Reinforcement Learning, and performance metrics.

The following are cluster ordering policy (COP) examples, where textual units are ordered or reordered within a text cluster. These COPs are examples involving textual units from a source document with no redundancies: original order, longest unit first, most significant entity first, most entities per unit first, unit closest to cluster center first, order after vocabulary normalization.

FIG. 5 illustrates an example document comparison 500 showing an example source document 502 with no redundancy and an example target document 504 with no redundancy, where the target document contains text clusters that are reordered, according to some implementations. Shown on the left is a source document 502 with no redundancy. Shown on the right is a target document 504 with no redundancy, where target document 504 contains text clusters that are reordered.

As shown, source document 502 includes text 512 and text 514. In this example implementation, text 512 is a paragraph containing two sentences indicated by solid lines. Text 514 is a paragraph containing four sentences indicated by dashed lines, to visually distinguish from those of text 512 for ease of illustration.

In various implementations, the system reorders the sentences of text 512 to a text cluster 522 of target document 504, and reorders the sentences of text 514 to a text cluster 524 of target document 504, as indicated by the sentence numbering (e.g., 1, 2, etc.). As shown, the resulting sentence order of text cluster 522 is different from that of text 512, and the resulting sentence order of text cluster 524 is different from that of text 514.

Figure 6:
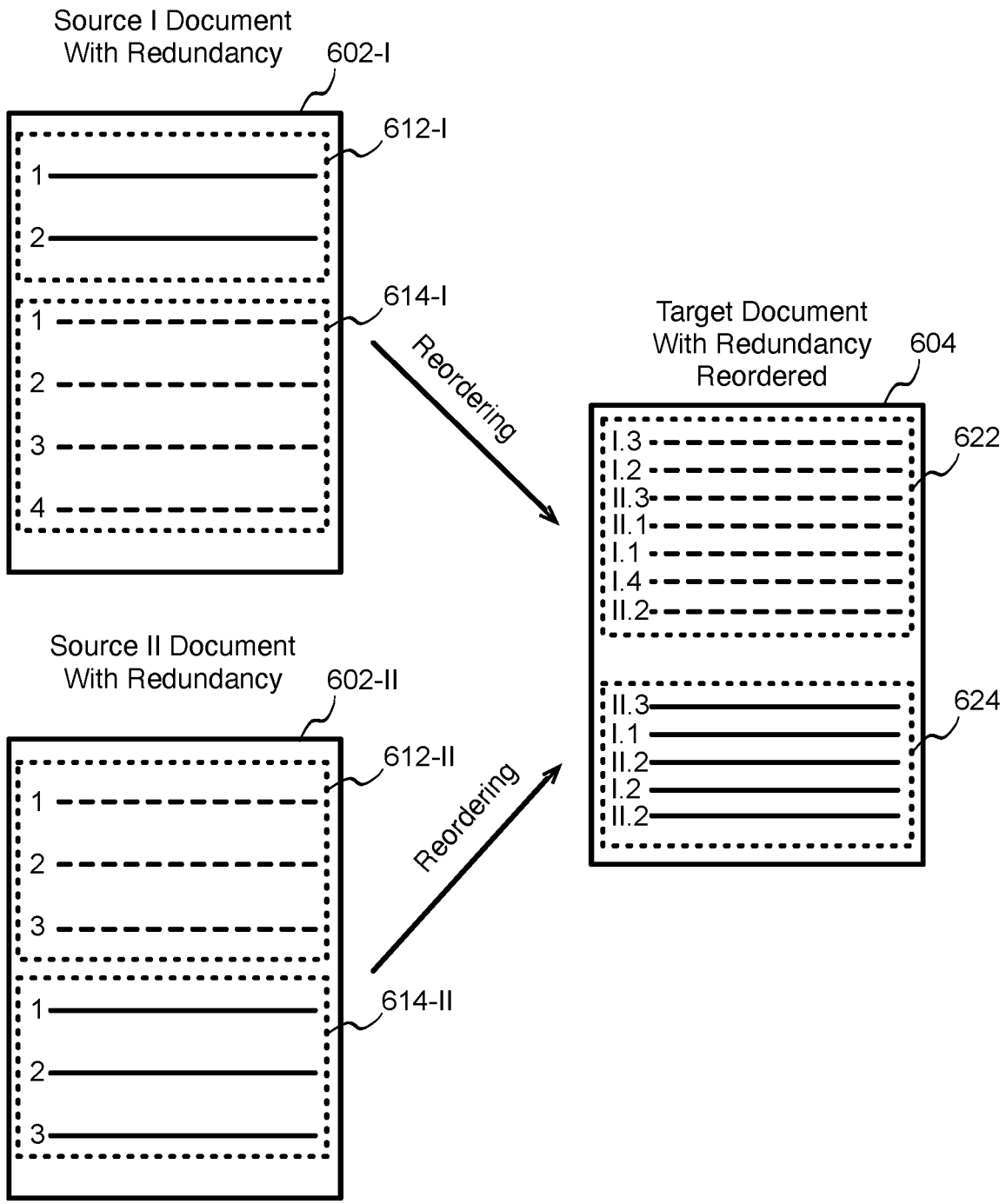
FIG. 6 illustrates two example source documents with redundancy and an example target document with redundancy, where the target document contains text clusters with new combinations of text that are reordered, according to some implementations.

FIG. 6 illustrates example documents 600 showing two example source documents with redundancy, 602-I and 602-II, and an example target document with redundancy 604, where the target document contains text clusters with new combinations of text that are reordered, according to some implementations. Shown on the left are a source document 602-I with redundancy and a source document 602-II with redundancy. Shown on the right is a target document 604 with no redundancy, where target document 604 contains text clusters with new combinations of text that are reordered.

As shown, source document 602-I includes text 612-I and text 614-I, and source document 602-II includes text 612-II and text 614-II. Also, target source document 602-I includes text cluster 622 and text cluster 624. In this example implementation, text 612-I is a paragraph containing two sentences indicated by solid lines. Text 614-I is a paragraph containing four sentences indicated by dashed lines, to visually distinguish from those of text 612-I for ease of illustration. Similarly, text 612-II is a paragraph containing two sentences indicated by dashed lines. Text 614-II is a paragraph containing four sentences indicated by solid lines, to visually distinguish from those of text 612-II for ease of illustration.

In various implementations, the system reorders the sentences of text 612-I, text 614-I, 612-II, and text 614-II. The system also recombines these sentences in a text cluster 622 and in text cluster 624 of target document 604, as indicated by the sentence numbering (e.g., I.1, I.2, I.3, II.1, II.2, II.3 etc.). As shown, the resulting order of the sentences and the resulting combination of the sentences text clusters 622 and 624 is different from those of text 612-I, text 614-I, 612-II, and text 614-II.

These COPs are examples involving textual units from a source document with redundancies: mix redundant text units from all sources and ordering them together like the no redundancy case, and rank the sources first then order each source's units like above.

The follow are example embodiments of the present disclosure. The terms embodiment and implementation may be used interchangeably. The following embodiment is directed to text clustering optimizing for multiple text properties. In various implementations, the set of text properties with associated metrics may include: coherence, consistency, cohesiveness, concordance, consonance, connection, interconnection, interrelationship, intertextuality, congruity, continuity, linkage, solidarity, unity, harmony, oneness, sameness, wholeness, interrelatedness, togetherness, entireness, soundness, federation, balance, and appropriate size. For simplicity and without loss of generality, the terms "cohesion" and "readability" refer to combinations of subsets of the above text properties. In various implementations, the system performs the clustering to optimize cohesion per cluster and readability per cluster. Optionally, the text may be pre-processed to achieve a good embedding, including changing, transforming or altering the size or format of the text, to enable a better separation. The system defines a weighted graph for a set of textual units, where each textual unit (e.g., word, phrase, or sentence) in the set is a node in the graph, and there is an edge between each pair of nodes that is weighted by the distance or similarities of the corresponding nodes. The system uses the weightings to optimally place the N nodes into K clusters.

The following embodiment is similar to the previous embodiment, where text clustering optimizing for multiple text properties, with the addition of cluster balancing. In various implementations, each node in the graph is labeled with a size attribute which is directly computed as the size of the textual unit for that node. In this embodiment, text rebalancing rule is added as an additional cluster metric. The system may use Munkre's assignment algorithm to assign N node to K Clusters, which achieves the inter-cluster balance. For each cluster, the system uses the ordering polices to order the units in the cluster.

The following embodiment is directed to clustering by statistical metrics. In this embodiment, presume that there is a functional technique tested with English paragraphs. The technique may follow these steps, for example. First, the system categorizes the text into multiple groups based on statistical measurements of the text, for example words per sentence, length of text, number of sentences per text, etc. For each group, the system separates the text into sentences. The system then determines the number of bullets suitable for the text based on category determined in the first step that could optimize the balance the length per bullet. Alternatively, the end user may also pass on a bullet number. The system then computes pairwise sentences' similarities or metrics that measure the sentences' meaning closeness for the text, and build the graph representation of the text. Based on the number of bullets and pairwise sentences, the system separates the graph into number of bullet parts, where each part has a balanced number of sentences, and each part's sentences have closeness of meaning optimized. The system then re-orders the sentences per cluster into the original orders presented in the text. The system repeats the steps after the first step for each group defined in the first step.

The following embodiment is similar to the previous embodiment, where clustering is performed based on statistical metrics, with the addition of a feedback loop to optimize embedding. After the text units embedding and before the building of graph, the heuristic preference rules may trigger a feedback loop to the embedding stage. This feedback loop may modify the tokenization and/or embedding to suite the specific needs of the heuristic rules.

The following embodiment is directed to clustering for topic modeling. Implementations described herein may be applied directly for topic modelling, where each cluster essentially represents a topic. All words, phrases or sentences, or the top N elements, belong to the same cluster could be used to represent the meaning of the cluster/topic. For an English paragraph, implementations may involve the following steps. First, the system receives a number from a user, where the user defines number of topics that the user would like to extract from the text. The system categorizes the text into multiple groups based on statistical measurements of the text (e.g., words per sentence, length of text, number of sentences per text, etc.). For each group identified in the first step, the system separates the text into sentences. The system then computes pairwise sentences' similarities or metrics that measure the sentences' meaning closeness for the text, and builds the graph representation of the text. Based on the pairwise sentences' similarities, the system separates the graph into user defined number of topics, where each topic is represented by an eigenvector derived from the graph representation. The system then returns all sentences or closest N sentences to the eigenvector per topic to represent each topic. The system repeats computation of the pairwise sentences' similarities on each group defined in the first step.

The following embodiment is directed to variations for different types and sizes of text units. In this example embodiments, the text units include phrase, sentence, paragraph, bullet, quote, section, page, chapter, document, book, stream, transcript. Implementations apply to text with different length, on top of different levels/units of information while maintaining high cohesion and readability. For example, implementations may be applied on a sentence level and form clusters of words or phrases, on an article level and form clusters of either paragraphs, sentences, phrases or words, or even be applied for multiple documents, and group similar documents together, with cohesion and readability optimized.

The following embodiment is directed to multi-language text. The algorithm itself is language independent. This robustness is guaranteed by computing the similarities with only embeddings of text. As such, the input text could be in language other than English, or even mixed multi-language text. Even if the language is rarely used and no embedding tools could be found, translation to a common language could still be applied and enable further steps, this is also considered as a functionality of the algorithm.

Implementations described herein provide various benefits. For example, implementations summarize text in documents based on requirements or preference heuristics of a user. Implementations also provide preference heuristics such as balance, coherence, order, priority, etc., and any combinations thereof.

Figure 7:
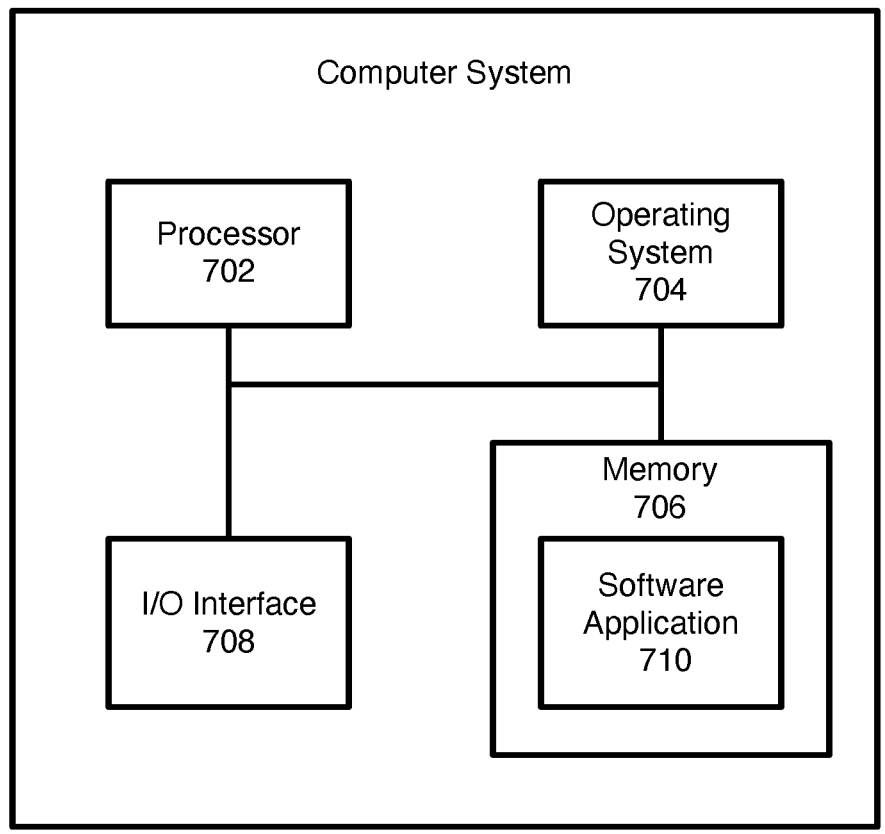
FIG. 7 is a block diagram of an example computer system, which may be used for some implementations described herein.

FIG. 7 is a block diagram of an example computer system 700, which may be used for some implementations described herein. For example, computer system 700 may be used to implement the embodiments described in FIGS. 1 to 6. In some implementations, computer system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computer system 700 or any suitable processor or processors associated with computer system 700 or any suitable system may perform the steps described. Implementations described herein may be carried out on a user device, on a server, or a combination of both.

Computer system 700 also includes a software application 710, which may be stored on memory 706 or on any other suitable storage location or computer-readable medium. Software application 710 provides instructions that enable processor 702 to perform the implementations described herein and other functions. Software application 710 may also include an engine such as a network engine for performing various functions associated with one or more networks and network communications. The components of computer system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computer system 700 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   receiving an electronic source document containing text;
   dividing the text into text units;
   encoding the text units;
   transforming the text units into numerical values, wherein the text units are associated with their respective numeric values;
   generating a graph of the text units based on the numeric values, wherein the graph comprises nodes corresponding to the text units and edges corresponding to pairs of the text units;
   ordering the text units into text clusters based on the graph of the text units; and
   generating an electronic target document that presents the text clusters based on one or more preference heuristics.

2. The system of claim 1, wherein the text units comprise one or more of text, sentences, and paragraphs.

3. The system of claim 1, the logic when executed is further operable to cause the one or more processors to perform operations comprising selecting one or more preference heuristics, wherein the one or more preference heuristics comprise balancing.

4. The system of claim 1, the logic when executed is further operable to cause the one or more processors to perform operations comprising selecting one or more one or more preference heuristics, wherein the one or more preference heuristics comprise coherence.

5. The system of claim 1, wherein when generating the graph, the logic when executed is further operable to cause the one or more processors to perform operations comprising associating one or more preference heuristics with the nodes.

6. The system of claim 1, wherein when generating the graph, the logic when executed is further operable to cause the one or more processors to perform operations comprising computing distance values for the edges.

7. The system of claim 1, wherein when generating the graph, the logic when executed is further operable to cause the one or more processors to perform operations comprising computing seed clusters from the text units based on one or more preference heuristics associated with the nodes.

8. A non-transitory computer-readable storage medium with program instructions stored thereon, the program instructions when executed by one or more processors are operable to cause the one or more processors to perform operations comprising:
   receiving an electronic source document containing text;
   dividing the text into text units;
   encoding the text units;
   transforming the text units into numerical values;
   generating a graph of the text units based on the numeric values, wherein the graph comprises nodes corresponding to the text units and edges corresponding to pairs of the text units;
   ordering the text units into text clusters based on the graph of the text units; and
   generating an electronic target document that presents the text clusters based on one or more preference heuristics.

9. The computer-readable storage medium of claim 8, wherein the text units comprise one or more of text, sentences, and paragraphs.

10. The computer-readable storage medium of claim 8, the instructions when executed are further operable to cause the one or more processors to perform operations comprising selecting one or more preference heuristics, wherein the one or more preference heuristics comprise balancing.

11. The computer-readable storage medium of claim 8, the instructions when executed are further operable to cause the one or more processors to perform operations comprising selecting one or more one or more preference heuristics, wherein the one or more preference heuristics comprise coherence.

12. The computer-readable storage medium of claim 8, wherein when generating the graph, the instructions when executed are further operable to cause the one or more processors to perform operations comprising associating one or more preference heuristics with the nodes.

13. The computer-readable storage medium of claim 8, wherein when generating the graph, the instructions when executed are further operable to cause the one or more processors to perform operations comprising computing distance values for the edges.

14. The computer-readable storage medium of claim 8, wherein when generating the graph, the instructions when executed are further operable to cause the one or more processors to perform operations comprising computing seed clusters from the text units based on one or more preference heuristics associated with the nodes.

15. A computer-implemented method comprising:
   receiving an electronic source document containing text;
   dividing the text into text units;
   encoding the text units;
   transforming the text units into numerical values;
   generating a graph of the text units based on the numeric values, wherein the graph comprises nodes corresponding to the text units and edges corresponding to pairs of the text units;
   ordering the text units into text clusters based on the graph of the text units; and
   generating an electronic target document that presents the text clusters based on one or more preference heuristics.

16. The method of claim 15, wherein the text units comprise one or more of text, sentences, and paragraphs.

17. The method of claim 15, further comprising selecting one or more preference heuristics, wherein the one or more preference heuristics comprise balancing.

18. The method of claim 15, further comprising selecting one or more preference heuristics, wherein the one or more preference heuristics comprise coherence.

19. The method of claim 15, wherein when generating the graph, the method further comprises associating one or more preference heuristics with the nodes.

20. The method of claim 15, wherein when generating the graph, the method further comprises computing distance values for the edges.

\* \* \* \* \*